A. O. LUNDELL.
MACHINE AND METHOD FOR HANDLING AND INSPECTING MEAT
APPLICATION FILED APR. 12, 1918.
1,316,626.
Patented Sept. 23, 1919.
3 SHEETS—SHEET 1.
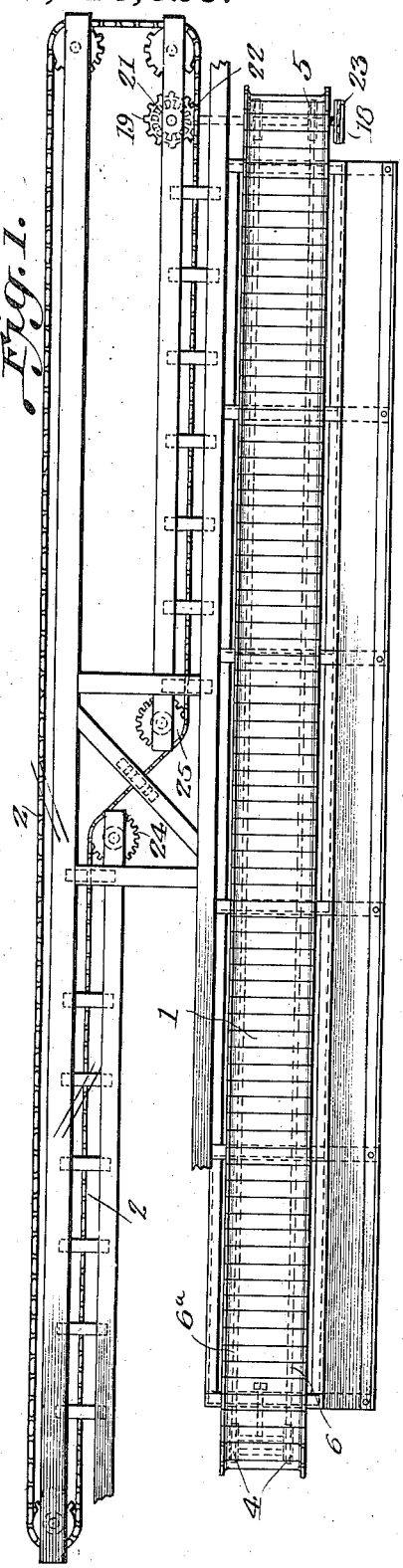
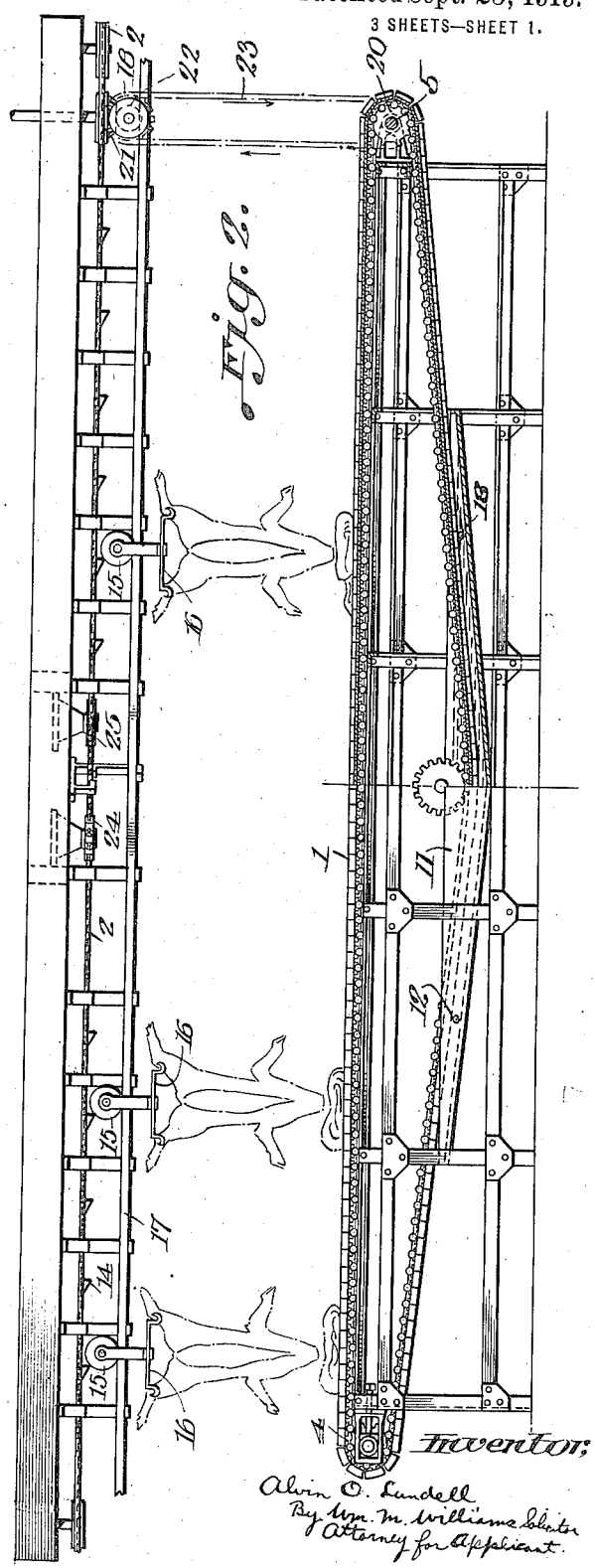

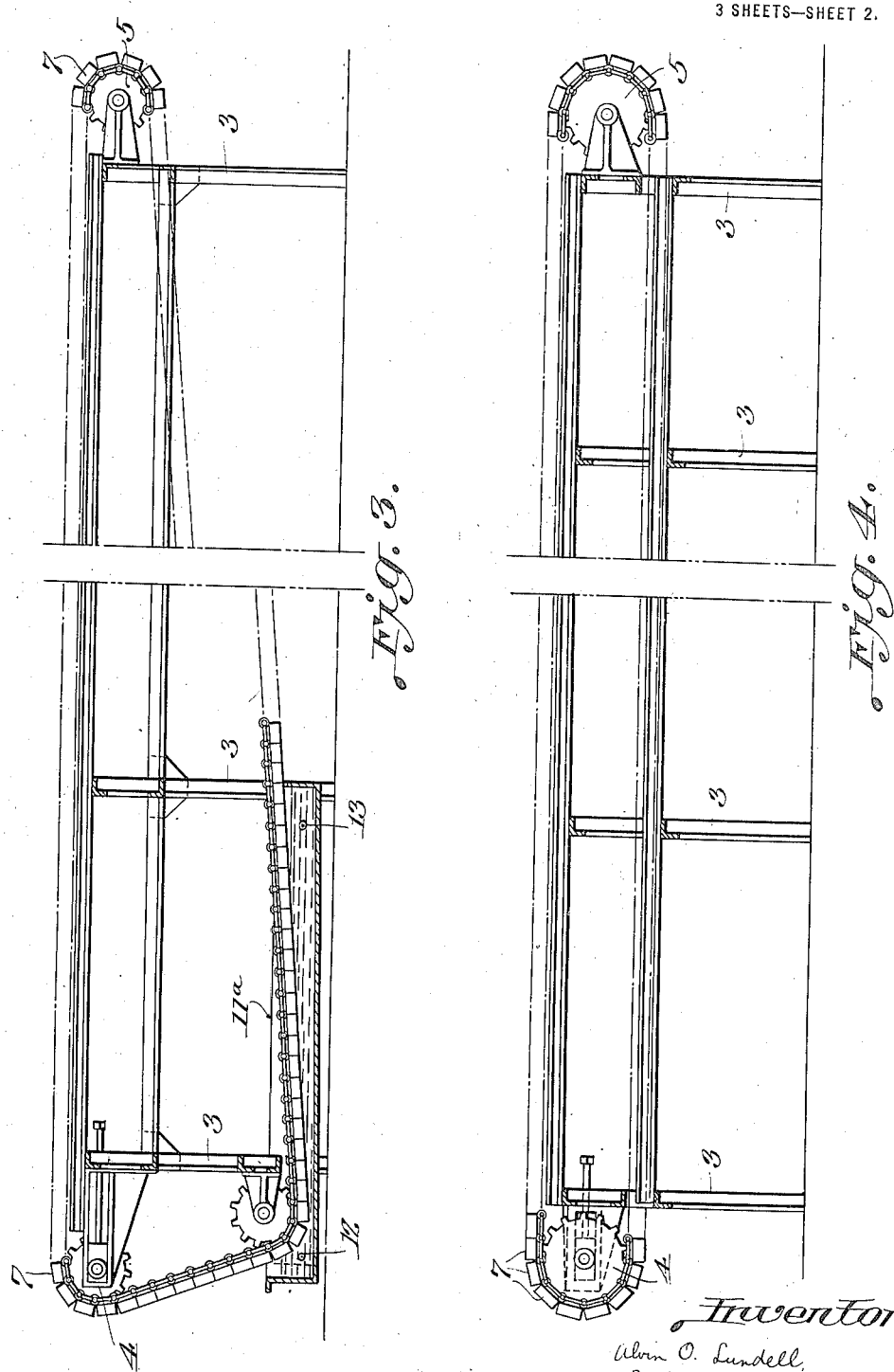

A. O. LUNDELL.
MACHINE AND METHOD FOR HANDLING AND INSPECTING MEAT.
APPLICATION FILED APR. 12, 1913.
1,316,626.
Patented Sept. 23, 1919.
3 SHEETS—SHEET 3.
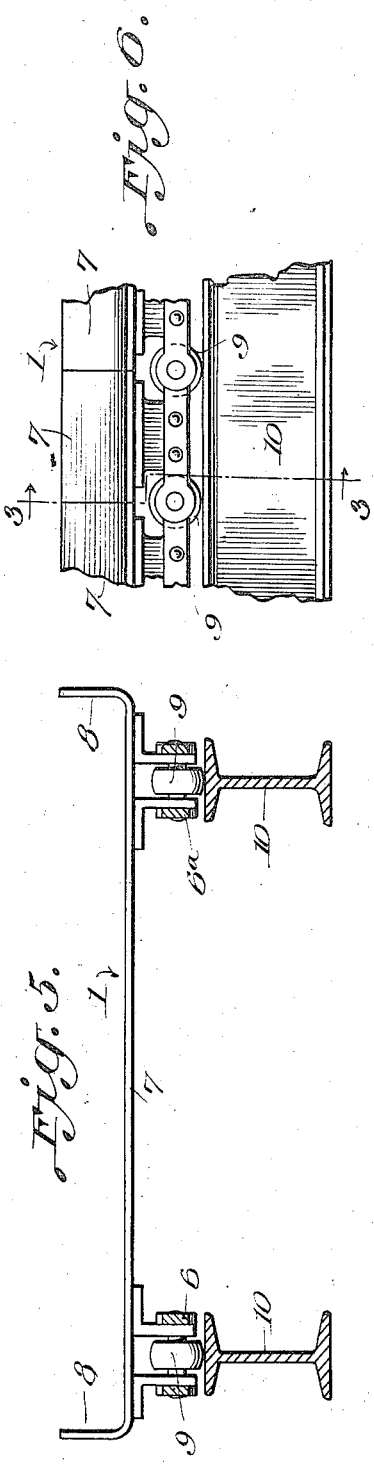
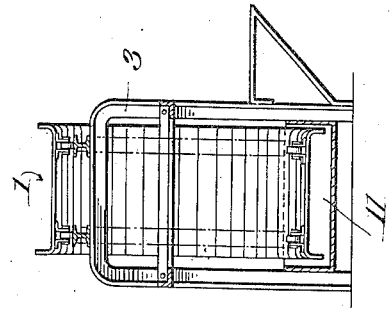
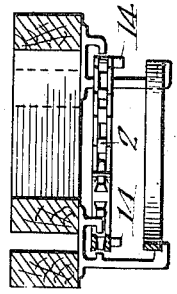

UNITED STATES PATENT OFFICE.

ALVIN O. LUNDELL, OF SOUTH ST. JOSEPH, MISSOURI.

MACHINE AND METHOD FOR HANDLING AND INSPECTING MEAT.

1,316,626. Specification of Letters Patent. Patented Sept. 23, 1919.

Application filed April 12, 1918. Serial No. 228,160½.

(FILED UNDER THE ACT OF MARCH 3, 1883, 22 STAT. L., 625.)

*To all whom it may concern:*

Be it known that I, ALVIN O. LUNDELL, a citizen of the United States, residing in the city of South St. Joseph, county of Buchanan, State of Missouri, (whose post-office address is Live Stock Exchange Bldg. Annex, South St. Joseph, Missouri,) have invented Machines and Methods for Handling and Inspecting Meat.

This application is made under the act of March 3, 1883, chapter 143 (22 Stat., 625), and the invention herein described and claimed may be used by the Government of the United States or any of its officers or employees in the prosecution of work for the Government, or any person in the United States without payment to me of any royalty.

My invention relates to a machine consisting of a movable table top and a movable overhead chain which operate synchronously, together with a sterilization tray or receptacle and perforated pipes for hot water and steam and method of handling and inspecting meat.

The object of my invention is to provide means whereby handling and inspection of the carcasses of cattle, sheep, goats and swine and of the viscera thereof may be facilitated. A further object of my invention is to provide a new and improved method of handling and inspecting meat. Heretofore beef and other carcasses have been eviscerated on a stationary bench or table on which the employees stood while working. This method had many objectionable features and when viewed from a meat inspection standpoint deserved severe criticism. Meat inspectors were placed in a position where they could not at all times identify the various carcasses and their parts after detecting lesions of disease; furthermore no practical means were provided for preventing the contamination of the bench by diseased parts of carcasses and no satisfactory way had been devised for cleaning the bench after it had become contaminated.

In the use of my invention a ready inspection of the viscera is possible by permitting the inspector to occupy a fixed position while the viscera and other parts are viewed or passed conveniently before him by the moving table. It permits positive identification of the sets of viscera because of the synchronous movement of the chain of the dressing rail and the moving top of the bench, the viscera from the carcass being deposited on the bench immediately opposite the carcass from which it is obtained, and it permits the cleanly removal of the caul, paunch, rennet and peck fats before the viscera are separated.

In the accompanying drawings illustrating one of the many possible embodiments of my invention, like reference numerals refer to similar parts throughout the several views.

Figure 1 is a plan view of my invention.

Fig. 2 is a side elevation, part in section.

Fig. 3 is a modification of the viscera conveyer, showing the sterilizing tray at one end.

Fig. 4 is a further modification, omitting the sterilizing tray.

Fig. 5 is a detail view of the viscera conveyer, being a section on the line 3—3 of Fig. 6.

Fig. 6 is a detail of the viscera conveyer in side elevation.

Fig. 7 is a view in cross-section of the carcass conveyer.

Fig. 8 is a cross section of the viscera conveyer.

Referring to the drawings in detail, my invention comprises a movable table top 1 constituted as an endless table top or viscera conveyer and a movable overhead chain 2 or carcass conveyer, which are mounted on suitable frames or structures and adapted to be operated synchronously, so that during the movement of the conveyers each carcass is suspended opposite the location of its respective viscera on the viscera table, enabling the official meat inspector, standing at a suitable point or location, to determine whether or not the carcass or its viscera or both are free from or contaminated with disease, for the purpose of making proper disposal thereof. The viscera table or conveyer, which is mounted on a suitable frame 3 which constitutes a suitable support for the sprocket wheels 4 and 5 for the conveyer chains 6 and 6ª. The body of the table consists of cross members or slats 7 secured to the sprocket chains, which cross members have upturned flanges 8. The viscera conveyer is further provided with roller bearings 9 secured to the conveyer chains, and which ride on tracks 10. The lower or return flight of the viscera table passes through a sterilization tray 11, if one be used, which may be located as in Fig. 2 approximately at the middle of the machine or preferably at one end, as disclosed in Fig. 3 at 11ᵃ. In Fig. 4 this sterilization tray is dispensed with entirely. Suitably mounted in connection with the sterilization tray are perforated pipes for hot water and steam 12 and 13. The carcass conveyer 2 may be of any suitable construction. In the construction shown it consists of an endless conveyer or sprocket chain, having downwardly projecting fingers 14, which are adapted to bear against the roller bearings 15 of the carcass gambrel 16, which is mounted to slide or roll on a rail 17, being pushed along by the fingers 14 of the sprocket chain, all of which is of well known construction.

The carcass conveyer is connected to the driving mechanism of the moving table by any suitable means. The drawing shows the carcass conveyer and the moving table top so constructed as to operate synchronously by means of suitably installed sprocket wheels, 18, 19, 20, beveled pinions, 21 22 and sprocket chain, 23, all as discovered on Figs. 1 and 2.

The arrangement of the carcass conveyer, whereby a part of the overhead chain is operated at some distance from the moving table, provides a space between the carcass that is being conveyed on the overhead chain and the moving table, in which space the cutter may stand for the purpose of eviscerating the hog and placing the viscera on the moving table top opposite the carcass from which it is removed. In order that the inspector may readily attach an identification tag to the carcass the chain conveying the carcass may be offset by means of sprockets 24 and 25, as disclosed by Fig. 1, thus bringing the carcass nearer the station of the inspector.

When operated the parts move together, and the inspector stands near the table and observes the carcass and viscera and makes proper disposition of the carcass and viscera, the main idea being always to keep the viscera near or opposite its respective carcass.

The table is designed to provide a sterile space to receive, as soon as removed, the viscera from the carcass and as the carcass is propelled along the rail the moving top of the table is moved with identical speed thereby maintaining the position of the viscera opposite the carcass from which it was obtained. These relative positions are maintained until the viscera is inspected and proper disposition made thereof.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having described my invention, I claim:

1. The combination in a meat handling and inspection machine, of a movable table top and a movable overhead conveyer, and a means to operate both synchronously.

2. The combination of a meat handling and inspection machine, of a movable table top adapted to hold viscera and a movable overhead conveyer adapted to suspend the carcass, and means to operate both synchronously, and means to sterilize the movable table top.

3. The combination in a meat handling and inspection machine of a movable table top comprising an endless conveyer and a movable overhead endless conveyer, so positioned that the viscera supported by the first conveyer will always be opposite the respective carcasses supported by the second conveyer, and means to operate both synchronously.

4. A method of handling and inspecting meat which consists in conveying or moving carcasses and their respective viscera synchronously, so that each carcass always maintains a definite position with respect to its respective viscera, and inspecting the viscera and the eviscerated carcass for the purpose of ascertaining whether infection exists therein.

5. In a device of the class described, a carcass conveyer and a viscera inspection table adapted to support viscera from the carcasses thereon, and means for moving the conveyer and table together so that the viscera is opposite its carcass.

In testimony whereof I affix my signature in the presence of two subscribing witnesses.

ALVIN O. LUNDELL.

Witnesses:
PAUL K. BARNHART,
E. A. KELLOGG.